US008625801B2

(12) United States Patent
Hu et al.

(10) Patent No.: US 8,625,801 B2
(45) Date of Patent: Jan. 7, 2014

(54) AUTHENTICATION ASSOCIATED SUITE DISCOVERY AND NEGOTIATION METHOD

(75) Inventors: Yanan Hu, Shaanxi (CN); Jun Cao, Shaanxi (CN); Yuelei Xiao, Shaanxi (CN); Manxia Tie, Shaanxi (CN); Zhenhai Huang, Shaanxi (CN); Xiaolong Lai, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 129 days.

(21) Appl. No.: 13/133,890

(22) PCT Filed: Dec. 8, 2009

(86) PCT No.: PCT/CN2009/075380
§ 371 (c)(1),
(2), (4) Date: Jun. 9, 2011

(87) PCT Pub. No.: WO2010/066185
PCT Pub. Date: Jun. 17, 2010

(65) Prior Publication Data
US 2011/0243330 A1    Oct. 6, 2011

(30) Foreign Application Priority Data
Dec. 9, 2008   (CN) .......................... 2008 1 0184136

(51) Int. Cl.
*H04W 12/06* (2009.01)
*H04W 12/04* (2009.01)
*H04L 9/32* (2006.01)

(52) U.S. Cl.
USPC ........... 380/278; 713/168; 713/169; 713/171; 370/338

(58) Field of Classification Search
USPC ...................................................... 380/278
See application file for complete search history.

(56) References Cited

U.S. PATENT DOCUMENTS

| | | | |
|---|---|---|---|
| 7,275,157 B2 * | 9/2007 | Cam Winget | 713/168 |
| 7,558,388 B2 * | 7/2009 | Ptasinski | 380/270 |
| 7,793,103 B2 * | 9/2010 | Fu et al. | 713/171 |
| 7,814,322 B2 * | 10/2010 | Gurevich et al. | 713/171 |
| 8,023,478 B2 * | 9/2011 | Cam-Winget et al. | 370/338 |
| 2004/0103282 A1 * | 5/2004 | Meier et al. | 713/171 |
| 2005/0063334 A1 * | 3/2005 | Fnu et al. | 370/329 |
| 2006/0045267 A1 * | 3/2006 | Moore et al. | 380/247 |
| 2006/0067526 A1 * | 3/2006 | Faccin et al. | 380/46 |
| 2007/0189249 A1 * | 8/2007 | Gurevich et al. | 370/338 |
| 2008/0002653 A1 * | 1/2008 | Hung et al. | 370/338 |
| 2008/0063204 A1 * | 3/2008 | Braskich et al. | 380/270 |
| 2008/0072047 A1 * | 3/2008 | Sarikaya et al. | 713/171 |
| 2008/0112363 A1 * | 5/2008 | Rahman et al. | 370/331 |
| 2009/0010438 A1 * | 1/2009 | Gilb | 380/277 |
| 2010/0332822 A1 * | 12/2010 | Liu et al. | 713/151 |

FOREIGN PATENT DOCUMENTS

| | | |
|---|---|---|
| CN | 1455556 | 11/2003 |
| CN | 101064645 | 10/2007 |
| CN | 101232419 | 7/2008 |
| CN | 101431518 | 5/2009 |

OTHER PUBLICATIONS

Varoutas, D., et al, 'Seventh Framework Programme Theme 3, ICT-213311 OMEGA, Deliverable D1.6, Recommendations and Guidelines for HAN', Information & Communication Technologies, Jan. 16, 2011, entire document, http://www.ict-omega.eu/fileadmin/documents/deliverables/Omega_D1.6.pdf.*
International Search Report issued in PCT/CN2009/075380, mailed Mar. 4, 2010.
Chinese Office Action issued in Chinese counterpart application 200810184136.7, dated Apr. 21, 2010.
ECMA-368; 3$^{rd}$ Edition/Dec. 2008; High Rate Ultra Wideband PHY and MAC Standard.

* cited by examiner

*Primary Examiner* — Edan Orgad
*Assistant Examiner* — Ronald Baum
(74) *Attorney, Agent, or Firm* — Greer, Burns & Crain, Ltd.

(57) ABSTRACT

An authentication associated suite discovery and negotiation method for ultra wide band network. The method includes the following steps of: 1) adding a pairwise temporal key PTK establishment IE and a group temporal key GTK distribution IE in an information element IE list of an initiator and a responder, and setting a corresponding information element identifier ID, and 2) an authentication associated process based on the authentication associated suite discovery and negotiation method. The authentication associated suite discovery and negotiation method for ultra wide band network provided by the present invention can provide the discovery and negotiation functions of a security solution to the network so as to satisfy all kinds of application requirements better when multiple pairwise temporal key PTK establishing plans or multiple group temporal key GTK distributing plans coexist.

15 Claims, No Drawings

AUTHENTICATION ASSOCIATED SUITE DISCOVERY AND NEGOTIATION METHOD

The present application is a US National Stage of International Application No. PCT/CN2009/075380, filed 8 Dec. 2009, designating the United States, and claiming claims priority to Chinese Patent Application No. 200810184136.7, filed with the Chinese Patent Office on Dec. 9, 2008 and entitled "Method for discovering and negotiating about authentication and association suite", both of which are hereby incorporated by reference in their entirety.

FIELD OF THE INVENTION

The present invention relates to a method for discovering and negotiating about an authentication and association suite and particularly to a method for discovering and negotiating about an authentication and association suite applicable in an ultra wideband network.

BACKGROUND OF THE INVENTION

The European Computer Manufacturers Association (ECMA) proposed the Ultra Wideband (UWB) specification at the physical layer and the MAC layer as defined in the standard of ECMA368 in 2005. Ultra Wideband (UWB) refers to carrier-free communication where data is transmitted in a sine wave narrow pulse on the order of nanoseconds to microseconds. Only a 4-way handshake protocol for creating or updating a Pairwise Temporal Key (PTK) between Ultra Wideband (UWB) devices and a Group Temporal Key (GTK) distribution protocol for creating or updating a Group Temporal Key (GTK) between Ultra Wideband (UWB) devices are designed for an authentication and association process in the standard of ECMA368. The authentication and association process may be performed in the following two scenarios.

1) Passive scanning: a responder waits for reception of relevant information transmitted from an initiator 1.1) the initiator broadcasts relevant Information Elements (IEs) (e.g., several system parameters, etc.) about a device of the initiator in a beacon frame periodically;

1.2) the responder checks whether the beacon frame transmitted form the initiator includes all of Information Elements (IEs) required for the authentication and association process upon reception of the beacon frame transmitted form the initiator, and if so, then an operation of 1.5) is executed; otherwise, the responder transmits to the initiator a probe request frame including the identifier (ID) of an Information Element (IE) requested by the responder from the initiator;

1.3) the initiator constructs and transmits to the responder a probe response frame including the Information Element (IE) requested by the responder from the initiator according to the identifier (ID) of the Information Element (IE) requested in the probe request frame upon reception of the probe request frame transmitted from the responder;

1.4) the responder checks whether the contents of the Information Element (IE) complies with required authentication and association upon reception of the probe response frame transmitted from the initiator, and if not so, then no authentication and association process can be performed; otherwise, the operation of 1.5) is executed; and 1.5) the responder initiates the 4-way handshake protocol for creating or updating a Pairwise Temporal Key (PTK) between Ultra Wideband (UWB) devices or the Group Temporal Key (GTK) distribution protocol for creating or updating a Group Temporal Key (GTK) between the Ultra Wideband (UWB) devices after the Pairwise Temporal Key (PTK) between the Ultra Wideband (UWB) devices has been created successfully; and the initiator and the responder finish the authentication and association process after both of them have created successfully the Pairwise Temporal Key (PTK) and the Group Temporal Key (GTK).

2) Active scanning: the responder requests relevant information actively from the initiator 2.1) if the responder receives no beacon frame transmitted from the initiator, then the responder transmits to the initiator a probe request frame including the identifier (ID) of an Information Element (IE) requested by the responder from the initiator;

2.2) the initiator constructs and transmits to the responder a probe response frame including the Information Element (IE) requested by the responder from the initiator according to the identifier (ID) of the Information Element (IE) requested in the probe request frame upon reception of the probe request frame transmitted from the responder;

2.3) the responder checks whether the contents of the Information Element (IE) complies with required authentication and association upon reception of the probe response frame transmitted from the initiator, and if not so, then no authentication and association process can be performed; otherwise, an operation of 2.4) may be executed; and 2.4) the responder initiates the 4-way handshake protocol for creating or updating a Pairwise Temporal Key (PTK) between Ultra Wideband (UWB) devices or the Group Temporal Key (GTK) distribution protocol for creating or updating a Group Temporal Key (GTK) between the Ultra Wideband (UWB) devices after the Pairwise Temporal Key (PTK) between the Ultra Wideband (UWB) devices has been created successfully; and the initiator and the responder finish the authentication and association process after both of them have created successfully the Pairwise Temporal Key (PTK) and a Group Temporal Key (GTK).

The initiator and the responder thus establish a secure association relationship between them after performing the foregoing authentication and association process.

As can be apparent from the authentication and association process in the forgoing two scenarios, the authentication and association process in the standard of ECMA368 is designed for either a single solution to creation of a Pairwise Temporal Key (PTK) (the 4-way handshake protocol) or a single solution to distribution of a Group Temporal Key (GTK) (the Group Temporal Key (GTK) distribution protocol), and if there are plural solutions to creation of a Pairwise Temporal Key (PTK) or distribution of a Group Temporal Key (GTK), then no authentication and association process in the standard of ECMA368 can be performed. An Ultra Wideband (UWB) communication network in a real environment lends itself to a variety of applications, and also different capabilities of power, security, computation, etc., are required for devices in different application scenarios. In order to improve the efficiency of the devices and optimize resources of the network, plural authentication and association solutions are required to accommodate the applications in the different scenarios. Therefore, there is a need of a mechanism for discovering and negotiating about an authentication and association solution between devices supporting plural authentication and association solutions to perform mutual association between the devices.

SUMMARY OF THE INVENTION

In order to address the foregoing technical problem present in the prior art, the invention provides a method for discovering and negotiating about an authentication and association suite more applicable to Ultra Wideband (UWB).

In a technical solution of the invention, the invention is a method for discovering and negotiating about an authentication and association suite applicable to an ultra wideband network, which includes:

dependent upon an authentication and association process in the method for discovering and negotiating about an authentication and association suite, if an initiator and a responder are required to discover and negotiate about an authentication and association suite, then performing passive scanning (the responder waits for reception of information of a beacon frame transmitted from the initiator) or active scanning (the responder transmits to the initiator a probe request frame requesting for relevant information); and during the passive scanning or the active scanning, the responder adding, in a list of Information Elements, IEs, of the probe request frame transmitted to the initiator, a full field of Pairwise Temporal Key, PTK, Creation IE or Group Temporal Key, GTK, Distribution IE to declare a list of responder supportable mechanisms for creating a Pairwise Temporal Key, PTK, or mechanisms for distributing a Group Temporal Key, GTK; and the initiator constructing and transmitting to the responder a probe response frame according to the contents of the full field of Pairwise Temporal Key, PTK, Creation IE or Group Temporal Key, GTK, Distribution IE in the received probe request frame by adding, in a list of Information Elements, IEs, of the probe response frame, a full field of Pairwise Temporal Key, PTK, Creation IE or Group Temporal Key, GTK, Distribution IE to declare an initiator selected mechanism for creating a Pairwise Temporal Key, PTK, or mechanism for distributing a Group Temporal Key, GTK.

An indicator of whether to support discovery of and negotiation about a mechanism for creating a Pairwise Temporal Key, PTK, and an indicator of whether to support discovery of and negotiation about a mechanism for distributing a Group Temporal Key, GTK, are added in the beacon frame transmitted from the initiator; and an indicator of whether to support a process of discovering and negotiating about an authentication and association suite is added in the probe frame (including the probe request frame and the probe response frame) transmitted from the initiator or the responder.

If it is not required to discover and negotiate about a mechanism for creating a Pairwise Temporal Key, PTK, and a mechanism for distributing a Group Temporal Key, GTK, or a default security mechanism is used by the initiator and the responder, then the indicator of whether to support discovery of and negotiation about a mechanism for creating a Pairwise Temporal Key, PTK, and the indicator of whether to support discovery of and negotiation about a mechanism for distributing a Group Temporal Key, GTK, both of which are newly added in the beacon frame transmitted from the initiator, shall be configured as NO, and the indicator of whether to support a process of discovering and negotiating about an authentication and association suite, which is added in the probe frame (including the probe request frame and the probe response frame) transmitted from the initiator or the responder, shall also be configured as NO;

the Pairwise Temporal Key, PTK, Creation IE is in the following format:

| Information element identifier (ID) | Length | The number of PTK creation mechanisms | PTK creation mechanism 1 | ... | PTK creation mechanism n | PTK creation mechanism selected for use |
| --- | --- | --- | --- | --- | --- | --- | where:

the number of PTK creation mechanisms represents the number of sender supportable mechanisms for creating a Pairwise Temporal Key, PTK;

the fields of PTK creation mechanism 1 to PTK creation mechanism n list the identifiers, IDs, of respective sender supportable mechanisms for creating a Pairwise Temporal Key, PTK; and the field of PTK creation mechanism selected for use represents the identifier, ID, of a PTK creation mechanism selected by the initiator.

The Group Temporal Key, GTK, Creation IE is in the following format:

| Information element identifier (ID) | Length | The number of GTK distribution mechanisms | GTK distribution mechanism 1 | ... | GTK distribution mechanism n | GTK distribution mechanism selected for use |
| --- | --- | --- | --- | --- | --- | --- | where:

the number of GTK distribution mechanisms represents the number of sender supportable mechanisms for distributing a Group Temporal Key, GTK;

the fields of GTK distribution mechanism 1 to GTK distribution mechanism n list the identifiers, IDs, of respective sender supportable mechanisms for distributing a Group Temporal Key, GTK; and the field of GTK distribution mechanism selected for use represents the identifier, ID, of a GTK distribution mechanism selected by the initiator.

The passive scanning includes:

1) the initiator broadcasting relevant Information Elements, IEs, (e.g., several system parameters) about a device of the initiator in the beacon frame periodically, where the indicator of discovery of and negotiation about a mechanism for creating a Pairwise Temporal Key, PTK, and the indicator of discovery of and negotiation about a mechanism for distributing a Group Temporal Key, GTK, are configured as SUPPORTED;

2) upon reception of the beacon frame transmitted from the initiator, the responder determining a process of discovering and negotiating about an authentication and association suite to be performed and transmitting to the initiator the probe request frame in which the indicator of a process for discovering and negotiating about an authentication and association suite is configured as SUPPORTED, and the full field of Pairwise Temporal Key, PTK, Creation IE or Group Temporal Key, GTK, Distribution IE is included in the list of Information Elements, IEs, of the probe request frame to declare the list of responder supportable mechanisms for creating a Pairwise Temporal Key, PTK, or mechanisms for distributing a Group Temporal Key, GTK; and furthermore, the responder checking whether the beacon frame transmitted form the initiator includes all of Information Elements, IEs, required for the authentication and association process, and if not so, then the probe request frame transmitted to the initiator further including the identifier, ID, of an Information Element, IE, requested by the responder from the initiator;

3) upon reception of the probe request frame transmitted from the responder, the initiator constructing and transmitting to the responder the probe response frame according to the identifier, ID, of the requested Information Element, IE, and the contents of the full field of Pairwise Temporal Key, PTK, Creation IE or Group Temporal Key, GTK, Distribution IE in the probe request frame, where the indicator of a process for discovering and negotiating about an authentication and association suite is configured as SUPPORTED, and the full field of Pairwise Temporal Key, PTK, Creation IE or Group Temporal Key, GTK, Distribution IE is included in the list of Information Elements, IEs, of the probe response frame to declare the initiator selected mechanism for creating a Pairwise Temporal Key, PTK, or mechanism for distributing a Group Temporal Key, GTK; and the probe response frame further includes the Information Element, IE, requested by the responder from the initiator;

4) upon reception of the probe response frame transmitted from the initiator, the responder determining an authentication and association suite commonly used for both of the initiator and the responder and checking whether the contents of Information Elements, IEs, other than the authentication and association suite comply with required authentication and association, and if not so, then failing to perform the authentication and association process; otherwise, performing an operation of 5); and 5) the responder initiating the negotiated mechanism for creating or updating a Pairwise Temporal Key, PTK, between Ultra Wideband, UWB, devices or mechanism for creating or updating a Group Temporal Key, GTK, between the Ultra Wideband, UWB, devices after a Pairwise Temporal Key, PTK, between the Ultra Wideband, UWB, devices has been created successfully; and the initiator and the responder finishing the authentication and association process after both of them have created successfully a Pairwise Temporal Key, PTK, and a Group Temporal Key, GTK.

The active scanning includes:

1) if the responder receives no beacon frame transmitted from the initiator, then the responder transmitting to the initiator the probe request frame in which the indicator of a process for discovering and negotiating about an authentication and association suite is set to SUPPORTED, and the full field of Pairwise Temporal Key, PTK, Creation IE or Group Temporal Key, GTK, Distribution IE is included in the list of Information Elements, IEs, in the probe request frame to declare the list of responder supportable mechanisms for creating a Pairwise Temporal Key, PTK, or mechanisms for distributing a Group Temporal Key, GTK; and furthermore, the probe request frame further includes the identifier, ID, of an Information Element, IE, requested by the responder from the initiator;

2) upon reception of the probe request frame transmitted from the responder, the initiator constructing and transmitting to the responder the probe response frame according to the identifier, ID, of the requested Information Element, IE, and the contents of the full field of Pairwise Temporal Key, PTK, Creation IE or Group Temporal Key, GTK, Distribution IE in the probe request frame, where the indicator of a process for discovering and negotiating about an authentication and association suite is set to SUPPORTED, and the full field of Pairwise Temporal Key, PTK, Creation IE or Group Temporal Key, GTK, Distribution IE is included in the list of Information Elements, IEs, of the probe response frame to declare the initiator selected mechanism for creating a Pairwise Temporal Key, PTK, or mechanism for distributing a Group Temporal Key, GTK; and the probe response frame further includes the Information Element, IE, requested by the responder from the initiator;

3) upon reception of the probe response frame transmitted from the initiator, the responder determining an authentication and association suite commonly used for both of them and checking whether the contents of Information Elements, IEs, other than the authentication and association suite comply with required authentication and association, and if not so, then failing to perform the authentication and association process; otherwise, performing an operation of 4); and 4) the responder initiating the negotiated mechanism for creating or updating a Pairwise Temporal Key, PTK, between Ultra Wideband, UWB, devices or mechanism for creating or updating a Group Temporal Key, GTK, between the Ultra Wideband, UWB, devices after a Pairwise Temporal Key, PTK, between the Ultra Wideband, UWB, devices has been created successfully, so that the initiator and the responder finish the authentication and association process after both of them have created successfully a Pairwise Temporal Key, PTK, and a Group Temporal Key, GTK.

In the method for discovering and negotiating about an authentication and association suite applicable to an ultra wideband network according to the invention, a function of discovering and negotiating about a security solution can be provided over the network to better accommodate various application demands upon presence of plural solutions to creation of a Pairwise Temporal Key (PTK) or distribution of a Group Temporal Key (GTK).

DETAILED DESCRIPTION OF THE EMBODIMENTS

A specific implementation of the invention is as follows.

1) Two new Information Elements (IEs), i.e., a Pairwise Temporal Key (PTK) Creation IE and a Group Temporal Key (GTK) Distribution IE, are added and corresponding information element identifiers (ID), e.g., 24 and 25, are set in a list of Information Elements (IEs) of an initiator and a responder.

1.1) Pairwise Temporal Key (PTK) Creation IE: when the initiator and the responder are required to discover and negotiate about a mechanism for creating a Pairwise Temporal Key (PTK), a probe frame (including a probe request frame and a probe response frame) shall include a full field of the Pairwise Temporal Key (PTK) Creation IE in the following format:

| Information element identifier (ID) | Length | The number of PTK creation mechanisms | PTK creation mechanism 1 | ... | PTK creation mechanism n | PTK creation mechanism selected for use |
|---|---|---|---|---|---|---|

Where:

The number of PTK creation mechanisms represents the number of sender supportable mechanisms for creating a Pairwise Temporal Key (PTK);

The fields of PTK creation mechanism 1 to PTK creation mechanism n list the identifiers (IDs) of respective sender supportable mechanisms for creating a Pairwise Temporal Key (PTK). In an example of n being 3, the identifiers (IDs) of PTK creation mechanisms are as follows:

| Identifier of PTK creation mechanism | Description of authentication and association suite |
|---|---|
| 0000 | PTK creation mechanism 1 |
| 0001 | PTK creation mechanism 2 |
| 0010 | PTK creation mechanism 3 |
| 0011-1111 | Reserved |

The field of PTK creation mechanism selected for use represents the identifier (ID) of a PTK creation mechanism selected by the initiator. This field is invalid in a probe request frame and represents the identifier (ID) of a PTK creation mechanism selected for use by the initiator in a probe response frame;

1.2) Group Temporal Key (GTK) Distribution IE: when the initiator and the responder are required to discover and negotiate about a mechanism for creating a Group Temporal Key (GTK), a probe frame (including a probe request frame and a probe response frame) shall include a full field of the Group Temporal Key (GTK) Creation IE in the following format:

| Information element identifier (ID) | Length | The number of GTK distribution mechanisms | GTK distribution mechanism 1 | ... | GTK distribution mechanism n | GTK distribution mechanism selected for use |
|---|---|---|---|---|---|---|

Where:

The number of GTK distribution mechanisms represents the number of sender supportable mechanisms for distributing a Group Temporal Key (GTK);

The fields of GTK distribution mechanism 1 to GTK distribution mechanism n list the identifiers (IDs) of respective sender supportable mechanisms for distributing a Group Temporal Key (GTK). In an example of n being 3, the identifiers (IDs) of GTK distribution mechanisms are as follows:

| Identifier of GTK distribution mechanism | Description of authentication and association suite |
|---|---|
| 0000 | GTK distribution mechanism 1 |
| 0001 | GTK distribution mechanism 2 |
| 0010 | GTK distribution mechanism 3 |
| 0011-1111 | Reserved |

The field of GTK distribution mechanism selected for use represents the identifier (ID) of a GTK distribution mechanism selected by the initiator. This field is invalid in a probe request frame and represents the identifier (ID) of a GTK distribution mechanism selected for use by the initiator in a probe response frame;

2) An indicator of whether to support discovery of and negotiation about a mechanism for creating a Pairwise Temporal Key (PTK) and an indicator of whether to support discovery of and negotiation about a mechanism for distributing a Group Temporal Key (GTK) are added in a beacon frame transmitted from an initiator;

3) An indicator of whether to support a process of discovering and negotiating about an authentication and association suite is added in a probe frame (including a probe request frame and a probe response frame) transmitted from the initiator or the responder;

4) Dependent upon an authentication and association process in the method for discovering and negotiating about an authentication and association suite, if it is not required to discover and negotiate about a mechanism for creating a Pairwise Temporal Key (PTK) and a mechanism for distributing a Group Temporal Key (GTK) or a default security mechanism is used for both of the initiator and the responder, then the indicator of whether to support discovery of and negotiation about a mechanism for creating a Pairwise Temporal Key (PTK) and the indicator of whether to support discovery of and negotiation about a mechanism for distributing a Group Temporal Key (GTK), both of which are newly added in a beacon frame transmitted from the initiator, shall be configured as NO, and the indicator of whether to support a process of discovering and negotiating about an authentication and association suite, which is added in a probe frame (including a probe request frame and a probe response frame) transmitted from the initiator or the responder, shall also be configured as NO; or if the initiator and the responder are required to discover and negotiate about an authentication and association suite, then there arise two following scenarios as follows.

4.1) Passive scanning: the responder waits for reception of relevant information transmitted from the initiator 4.1.1) the initiator broadcasts relevant Information Elements (IEs) (e.g., several system parameters, etc.) about a device of the initiator in a beacon frame periodically to the outside, where the indicator of discovery of and negotiation about a mechanism for creating a Pairwise Temporal Key (PTK) and the indicator of discovery of and negotiation about a mechanism for distributing a Group Temporal Key (GTK) are configured as SUPPORTED;

4.1.2) upon reception of the beacon frame transmitted from the initiator, the responder determines a process of discovering and negotiating about an authentication and association suite to be performed and transmits to the initiator a probe request frame in which the indicator of a process of discovering and negotiating about an authentication and association suite is configured as SUPPORTED and a full field of Pairwise Temporal Key (PTK) Creation IE or Group Temporal Key (GTK) Distribution IE is added in a list of Information Elements (IEs) to declare a list of responder supportable mechanisms for creating a Pairwise Temporal Key (PTK) or mechanisms for distributing a Group Temporal Key (GTK); and furthermore, the responder checks whether the beacon frame transmitted form the initiator includes all of Information Elements (IEs) required for the authentication and association process, and if not so, then the probe request frame transmitted to the initiator further includes the identifier (ID) of an Information Element (IE) requested by the responder from the initiator;

4.1.3) upon reception of the probe request frame transmitted from the responder, the initiator constructs and transmits to the responder a probe response frame according to the identifier (ID) of the requested Information Element (IE) and the contents of the full field of Pairwise Temporal Key (PTK) Creation IE or Group Temporal Key (GTK) Distribution IE in the probe request frame, where the indicator of a process of discovering and negotiating about an authentication and association suite is configured as SUPPORTED and a full field of Pairwise Temporal Key (PTK) Creation IE or Group Temporal Key (GTK) Distribution IE is added in a list of Information Elements (IEs) to declare an initiator selected mechanism for creating a Pairwise Temporal Key (PTK) or mechanism for distributing a Group Temporal Key (GTK); and the probe response frame further includes the Information Element (IE) requested by the responder from the initiator;

4.1.4) upon reception of the probe response frame transmitted from the initiator, the responder determines an authentication and association suite commonly used for both of them and checks whether the contents of Information Elements (IEs) other than the authentication and association suite comply with required authentication and association, and if not so, then no authentication and association process can be performed; otherwise, the responder performs the operation of 4.1.5); and 4.1.5) the responder initiates the negotiated mechanism for creating or updating a Pairwise Temporal Key (PTK) between Ultra Wideband (UWB) devices or mechanism for creating or updating a Group Temporal Key (GTK) between the Ultra Wideband (UWB) devices after a Pairwise Temporal Key (PTK) between the Ultra Wideband (UWB) devices has been created successfully; and the initiator and the responder finish the authentication and association process after both of them have created successfully a Pairwise Temporal Key (PTK) and a Group Temporal Key (GTK).

4.2) Active scanning: the responder requests relevant information actively from the initiator 4.2.1) if the responder receives no beacon frame transmitted from the initiator, then the responder transmits to the initiator a probe request frame in which the indicator of a process of discovering and negotiating about an authentication and association suite is configured as SUPPORTED and a full field of Pairwise Temporal Key (PTK) Creation IE or Group Temporal Key (GTK) Distribution IE is added in a list of Information Elements (IEs) to declare responder supportable mechanisms for creating a Pairwise Temporal Key (PTK) or mechanisms for distributing a Group Temporal Key (GTK); and the probe request frame further includes the identifier of an Information Element (IE) requested by the responder from the initiator;

4.2.2) upon reception of the probe request frame transmitted from the responder, the initiator constructs and transmits to the responder a probe response frame according to the identifier (ID) of the requested Information Element (IE) and the contents of the full field of Pairwise Temporal Key (PTK) Creation IE or Group Temporal Key (GTK) Distribution IE in the probe request frame, where the indicator of a process of discovering and negotiating about an authentication and association suite is configured as SUPPORTED and a full field of Pairwise Temporal Key (PTK) Creation IE or Group Temporal Key (GTK) Distribution IE is added in a list of Information Elements (IEs) to declare an initiator selected mechanism for creating a Pairwise Temporal Key (PTK) or mechanism for distributing a Group Temporal Key (GTK); and the probe response frame further includes the Information Element (IE) requested by the responder from the initiator;

4.2.3) upon reception of the probe response frame transmitted from the initiator, the responder determines an authentication and association suite commonly used for both of them and checks whether the contents of Information Elements (IEs) other than the authentication and association suite comply with required authentication and association, and if not so, then no authentication and association process can be performed; otherwise, the responder performs the operation of 4.2.4); and 4.2.4) the responder initiates the negotiated mechanism for creating or updating a Pairwise Temporal Key (PTK) between Ultra Wideband (UWB) devices or mechanism for creating or updating a Group Temporal Key (GTK) between the Ultra Wideband (UWB) devices after a Pairwise Temporal Key (PTK) between the Ultra Wideband (UWB) devices has been created successfully; and the initiator and the responder finish the authentication and association process after both of them have created successfully a Pairwise Temporal Key (PTK) and a Group Temporal Key (GTK).

The initiator and the responder thus establish a secure association relationship between them after performing the foregoing authentication and association process.

The invention claimed is:

1. A method for discovering and negotiating about an authentication and association suite, comprising:
   dependent upon an authentication and association process in the method for discovering and negotiating about an authentication and association suite, when an initiating device and a responding device are required to discover and negotiate about an authentication and association suite, performing passive scanning in which the responding device waits for reception of information of a beacon frame transmitted from the initiating device and transmits to the initiating device a probe request frame after reception of the information of the beacon frame or active scanning in which the responding device transmits to the initiating device a probe request frame requesting for relevant information; and
   during the passive scanning or the active scanning, the responding device adding, in a list of Information Elements (IEs) of a probe request frame transmitted to the initiating device, a full field of Pairwise Temporal Key (PTK) Creation mechanism IE or Group Temporal Key (GTK) Distribution mechanism IE to declare a list of responding device supportable mechanisms for creating a PTK or mechanisms for distributing a GTK; and the initiating device constructing and transmitting to the responding device a probe response frame according to the contents of the full field of PTK Creation mechanism IE or GTK Distribution mechanism IE in a received probe request frame by adding, in a list of IEs of the probe response frame, a full field of PTK Creation mechanism IE or GTK Distribution mechanism IE to declare an initiating device selected mechanism for creating a PTK or mechanism for distributing a GTK.

2. The method for discovering and negotiating about an authentication and association suite according to claim 1, wherein:
   an indicator of whether to support discovery of and negotiation about a mechanism for creating a PTK and an indicator of whether to support discovery of and negotiation about a mechanism for distributing a GTK are added in the beacon frame transmitted from the initiating device; and
   an indicator of whether to support a process of discovering and negotiating about an authentication and association suite is added in the probe response frame transmitted from the initiating device and the probe request frame transmitted from the responding device.

3. The method for discovering and negotiating about an authentication and association suite according to claim 2, wherein:
   when it is not required to discover and negotiate about a mechanism for creating a PTK and a mechanism for distributing a GTK, or a default security mechanism is used for both of the initiating device and the responding device, the indicator of whether to support discovery of and negotiation about a mechanism for creating a PTK and the indicator of whether to support discovery of and negotiation about a mechanism for distributing a GTK, both of which are newly added in the beacon frame transmitted from the initiating device, shall be configured to indicate that discovery of and negotiation about a mechanism for creating a PTK and a mechanism for distributing a GTK is not supported, and the indicator of whether to support a process of discovering and negotiating about an authentication and association suite, which is added in the probe response frame transmitted from the initiating device and the probe request frame transmitted from the responding device, shall be configured to indicate that the process of discovering and negotiating about an authentication and association suite is not supported.

4. The method for discovering and negotiating about an authentication and association suite according to claim 2, wherein the passive scanning comprises:

1) the initiating device broadcasting relevant IEs about the initiating device in the beacon frame periodically;

2) upon reception of the beacon frame transmitted from the initiating device, the responding device determining a process of discovering and negotiating about an authentication and association suite to be performed and transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the responding device checking whether the beacon frame transmitted form the initiating device comprises all of IEs required for the authentication and association process, and when the beacon frame transmitted form the initiating device does not comprise all of IEs required for the authentication and association process, the probe request frame transmitted to the initiating device further comprising the ID of an IE requested by the responding device from the initiating device;

3) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

4) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 5); and 5) the responding device initiating a negotiated mechanism for creating or updating a PTK between Ultra Wideband (UWB) devices or mechanism for creating or updating a GTK between the UWB devices after a PTK between the UWB devices has been created successfully, and the initiating device and the responding device finishing the authentication and association process after both of them have created successfully a PTK and a GTK.

5. The method for discovering and negotiating about an authentication and association suite according to claim 2, wherein the active scanning comprises:

1) when the responding device receives no beacon frame transmitted from the initiating device, then the responding device transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the probe request frame further comprises the ID of an IE requested by the responding device from the initiating device;

2) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

3) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 4); and 4) the responding device initiating a negotiated mechanism for creating or updating a PTK between UWB devices or mechanism for creating or updating a GTK between the UWB devices after a PTK between the UWB devices has been created successfully, and the initiating device and the responding device finishing the authentication and association process after both of them have created successfully a PTK and a GTK.

6. The method for discovering and negotiating about an authentication and association suite according to claim 3, wherein the passive scanning comprises:

1) the initiating device broadcasting relevant IEs about the initiating device in the beacon frame periodically;

2) upon reception of the beacon frame transmitted from the initiating device, the responding device determining a process of discovering and negotiating about an authentication and association suite to be performed and transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the responding device checking whether the beacon frame transmitted form the initiating device comprises all of IEs required for the authentication and association process, and when the beacon frame transmitted form the initiating device does not comprise all of IEs required for the authentication and association process, the probe request frame transmitted to the initiating device further comprising the ID of an IE requested by the responding device from the initiating device;

3) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

4) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 5); and 5) the responding device initiating a negotiated mechanism for creating or updating a PTK between Ultra Wideband (UWB) devices or mechanism for creating or updating a GTK between the UWB devices after a PTK between the UWB, devices has been created successfully, and the initiating device and the responding device finishing the authentication and association process after both of them have created successfully a PTK and a GTK.

7. The method for discovering and negotiating about an authentication and association suite according to claim 3, wherein the active scanning comprises:

1) when the responding device receives no beacon frame transmitted from the initiating device, the responding device transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the probe request frame further comprises the ID of an I, requested by the responding device from the initiating device;

2) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

3) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 4); and 4) the responding device initiating a negotiated mechanism for creating or updating a PTK between UWB devices or mechanism for creating or updating a GTK between the UWB devices after a PTK between the UWB devices has been created successfully, and the initiating device and the responding device finishing the authentication and association process after both of them have created successfully a PTK and a GTK.

8. The method for discovering and negotiating about an authentication and association suite according to claim 1, wherein the PTK Creation mechanism IE includes:

a field of an information element identifier (ID);
a field of the length of the PTK Creation mechanism IE;
a field of the number of PTK creation mechanisms;
fields of PTK creation mechanism 1 to PTK creation mechanism n; and
a field of a PTK creation mechanism selected for use;
wherein:
the number of PTK creation mechanisms represents the number of sending device supportable mechanisms for creating a PTK;
the fields of PTK creation mechanism 1 to PTK creation mechanism n list the IDs of respective sending device supportable mechanisms for creating a PTK; and
the field of a PTK creation mechanism selected for use represents the ID of a PTK creation mechanism selected by the sending device.

9. The method for discovering and negotiating about an authentication and association suite according to claim 8, wherein the passive scanning comprises:

1) the initiating device broadcasting relevant IEs about the initiating device in the beacon frame periodically;

2) upon reception of the beacon frame transmitted from the initiating device, the responding device determining a process of discovering and negotiating about an authentication and association suite to be performed and transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the responding device checking whether the beacon frame transmitted form the initiating device comprises all of IEs required for the authentication and association process, and when the beacon frame transmitted form the initiating device does not comprise all of IEs required for the authentication and association process, the probe request frame transmitted to the initiating device further comprising the ID of an IE requested by the responding device from the initiating device;

3) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

4) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 5); and 5) the responding device initiating a negotiated mechanism for creating or updating a PTK, between Ultra Wideband (UWB) devices or mechanism for creating or updating a GTK between the UWB devices after a PTK between the UWB devices has been created successfully, and the initiating device and the responding device finishing the authentication and association process after both of them have created successfully a PTK and a GTK.

10. The method for discovering and negotiating about an authentication and association suite according to claim 8, wherein the active scanning comprises:

1) when the responding device receives no beacon frame transmitted from the initiating device, the responding device transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the probe request frame further comprises the ID of an IE requested by the responding device from the initiating device;

2) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

3) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 4); and 4) the responding device initiating a negotiated mechanism for creating or updating a PTK between UWB devices or mechanism for creating or updating a GTK between the UWB devices after a PTK between the UWB devices has been created successfully, and the initiating device and the responding device finishing the authentication and association process after both of them have created successfully a PTK and a GTK.

11. The method for discovering and negotiating about an authentication and association suite according to claim 1, wherein the GTK Distribution mechanism IE includes:
   a field of an information element identifier (ID);
   a field of the length of the GTK Distribution mechanism IE;
   a field of the number of GTK distribution mechanisms;
   fields of GTK distribution mechanism 1 to GTK distribution mechanism n; and
   a field of a GTK distribution mechanism selected for use;
   wherein:
   the number of GTK distribution mechanisms represents the number of sending device supportable mechanisms for distributing a GTK;
   the fields of GTK distribution mechanism 1 to GTK distribution mechanism n list the IDs of respective sending device supportable mechanisms for distributing a GTK; and
   the field of a GTK distribution mechanism selected for use represents the ID of a GTK distribution mechanism selected by the sending device.

12. The method for discovering and negotiating about an authentication and association suite according to claim 11, wherein the passive scanning comprises:

1) the initiating device broadcasting relevant IEs about the initiating device in the beacon frame periodically;

2) upon reception of the beacon frame transmitted from the initiating device, the responding device determining a process of discovering and negotiating about an authentication and association suite to be performed and transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the responding device checking whether the beacon frame transmitted form the initiating device comprises all of IEs required for the authentication and association process, and when the beacon frame transmitted form the initiating device does not comprise all of IEs required for the authentication and association process, the probe request frame transmitted to the initiating device further comprising the ID of an IE requested by the responding device from the initiating device;

3) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

4) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 5); and 5) the responding device initiating a negotiated mechanism for creating or updating a PTK between Ultra Wideband (UWB) devices or mechanism for creating or updating a GTK between the UWB devices after a PTK between the UWB devices has been created successfully, and the initiating device and the responding device finishing the authentication and association process after both of them have created successfully a PTK and a GTK.

13. The method for discovering and negotiating about an authentication and association suite according to claim 11, wherein the active scanning comprises:

1) when the responding device receives no beacon frame transmitted from the initiating device, then the responding device transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the probe request frame further comprises the ID of an IE requested by the responding device from the initiating device;

2) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

3) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 4); and 4) the responding device initiating a negotiated mechanism for creating or updating a PTK between UWB devices or mechanism for creating or updating a GTK between the UWB devices after a PTK between the UWB devices has been created successfully, and the initiating device and the responding device finishing the authentication and association process after both of them have created successfully a PTK and a GTK.

14. The method for discovering and negotiating about an authentication and association suite according to claim 1, wherein the passive scanning comprises:

1) the initiating device broadcasting relevant IEs about the initiating device in the beacon frame periodically;

2) upon reception of the beacon frame transmitted from the initiating device, the responding device determining a process of discovering and negotiating about an authentication and association suite to be performed and transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the responding device checking whether the beacon frame transmitted form the initiating device comprises all of IEs required for the authentication and association process, and when the beacon frame transmitted form the initiating device does not comprise all of IEs required for the authentication and association process, the probe request frame transmitted to the initiating device further comprising the ID of an IE requested by the responding device from the initiating device;

3) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

4) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 5); and 5) the responding device initiating a negotiated mechanism for creating or updating a PTK between Ultra Wideband (UWB) devices or mechanism for creating or updating a GTK between the UWB devices after a PTK between the UWB devices has been created successfully, and the initiating device and the responding device finishing the authentication and association process after both of them have created successfully a PTK and a GTK.

15. The method for discovering and negotiating about an authentication and association suite according to claim 1, wherein the active scanning comprises:

1) when the responding device receives no beacon frame transmitted from the initiating device, the responding device transmitting to the initiating device the probe request frame in which the full field of PTK Creation mechanism IE or GTK Distribution mechanism IE is comprised in the list of IEs to declare the list of responding device supportable mechanisms for creating a PTK or mechanisms for distributing a GTK; and furthermore, the probe request frame further comprises the ID of an IE requested by the responding device from the initiating device;

2) upon reception of the probe request frame transmitted from the responding device, the initiating device constructing and transmitting to the responding device the probe response frame according to the ID of the IE as requested and the contents of the full field of PTK Creation mechanism IE or GTK Distribution mechanism IE in the probe request frame, wherein the full field of PTK Creation mechanism IE or GTK Distribution mechanism IE is comprised in the list of IEs of the probe response frame to declare the initiating device selected mechanism for creating a PTK or mechanism for distributing a GTK; and the probe response frame further comprises the IE requested by the responding device from the initiating device;

3) upon reception of the probe response frame transmitted from the initiating device, the responding device determining an authentication and association suite commonly used for both of the initiating device and the responding device and checking whether the contents of IEs other than the authentication and association suite comply with required authentication and association, and if not so, then failing to perform the authentication and association process; otherwise, performing an operation of 4); and 4) the responding device initiating a negotiated mechanism for creating or updating a PTK between UWB devices or mechanism for creating or updating a GTK between the UWB devices after a PTK between the UWB devices has been created successfully, and the initiating device and the responding device finishing the authentication and association process after both of them have created successfully a PTK and a GTK.

* * * * *

UNITED STATES PATENT AND TRADEMARK OFFICE
CERTIFICATE OF CORRECTION

PATENT NO. : 8,625,801 B2
APPLICATION NO. : 13/133890
DATED : January 7, 2014
INVENTOR(S) : Yanan Hu et al.

Page 1 of 1

It is certified that error appears in the above-identified patent and that said Letters Patent is hereby corrected as shown below:

<u>On the Title Page</u>:

Item "(30) Foreign Application Priority Data", delete "2008 1 0184136" and insert --2008 10184136.7--.

<u>In the Claims</u>:

Col. 11, line 27, delete "form" and insert --from--.
Col. 11, line 29, delete "form" and insert --from--.
Col. 12, line 63, delete "form" and insert --from--.
Col. 12, line 65, delete "form" and insert --from--.
Col. 14, line 50, delete "form" and insert --from--.
Col. 14, line 52, delete "form" and insert --from--.
Col. 16, line 39, delete "form" and insert --from--.
Col. 16, line 41, delete "form" and insert --from--.
Col. 18, line 7, delete "form" and insert --from--.
Col. 18, line 9, delete "form" and insert --from--.

Signed and Sealed this
Seventh Day of October, 2014

Michelle K. Lee
*Deputy Director of the United States Patent and Trademark Office*